United States Patent [19]
Kobayashi et al.

[11] 3,986,169
[45] Oct. 12, 1976

[54] DEVICE PROTECTION METHOD AND APPARATUS

[75] Inventors: Yoshiki Kobayashi; Tadaaki Bandoh; Jushi Ide, all of Hitachi; Toshiro Kamiuchi, Kodaira, all of Japan

[73] Assignee: Hitachi, Ltd., Japan

[22] Filed: May 30, 1975

[21] Appl. No.: 582,147

[30] Foreign Application Priority Data
June 3, 1974  Japan.............................. 49-61880

[52] U.S. Cl. ..................... 340/146.1 C; 340/147 R
[51] Int. Cl.² ...................................... G08B 29/00
[58] Field of Search .......... 340/146.1 AG, 146.1 R, 340/146.1 C, 172.5, 147 R, 147 B, 147 C, 150

[56] References Cited
UNITED STATES PATENTS

| | | |
|---|---|---|
| 3,370,270 | 2/1968 | Cesareo ...................... 340/146.1 R |
| 3,384,873 | 5/1968 | Sharma ....................... 340/146.1 C |
| 3,794,834 | 2/1974 | Auer, Jr. et al............. 340/146.1 C |

OTHER PUBLICATIONS

B411,633, Jan. 1975, Bonser et al., 340/146.1 C.

*Primary Examiner*—Charles E. Atkinson
*Attorney, Agent, or Firm*—Craig & Antonelli

[57] ABSTRACT

In a multi-computer system having input/output devices for common use, protection is made for the devices upon transferring of the input/output data by comparing a device identifying number or address signal and a number signal identifying a central processor unit which demands the transfer of data, thereby to determine on the basis of the result of the comparison whether the data transfer between the device and the central processor unit is allowable. When the transfer is not admitted, the input/output operation of the device is inhibited.

4 Claims, 9 Drawing Figures

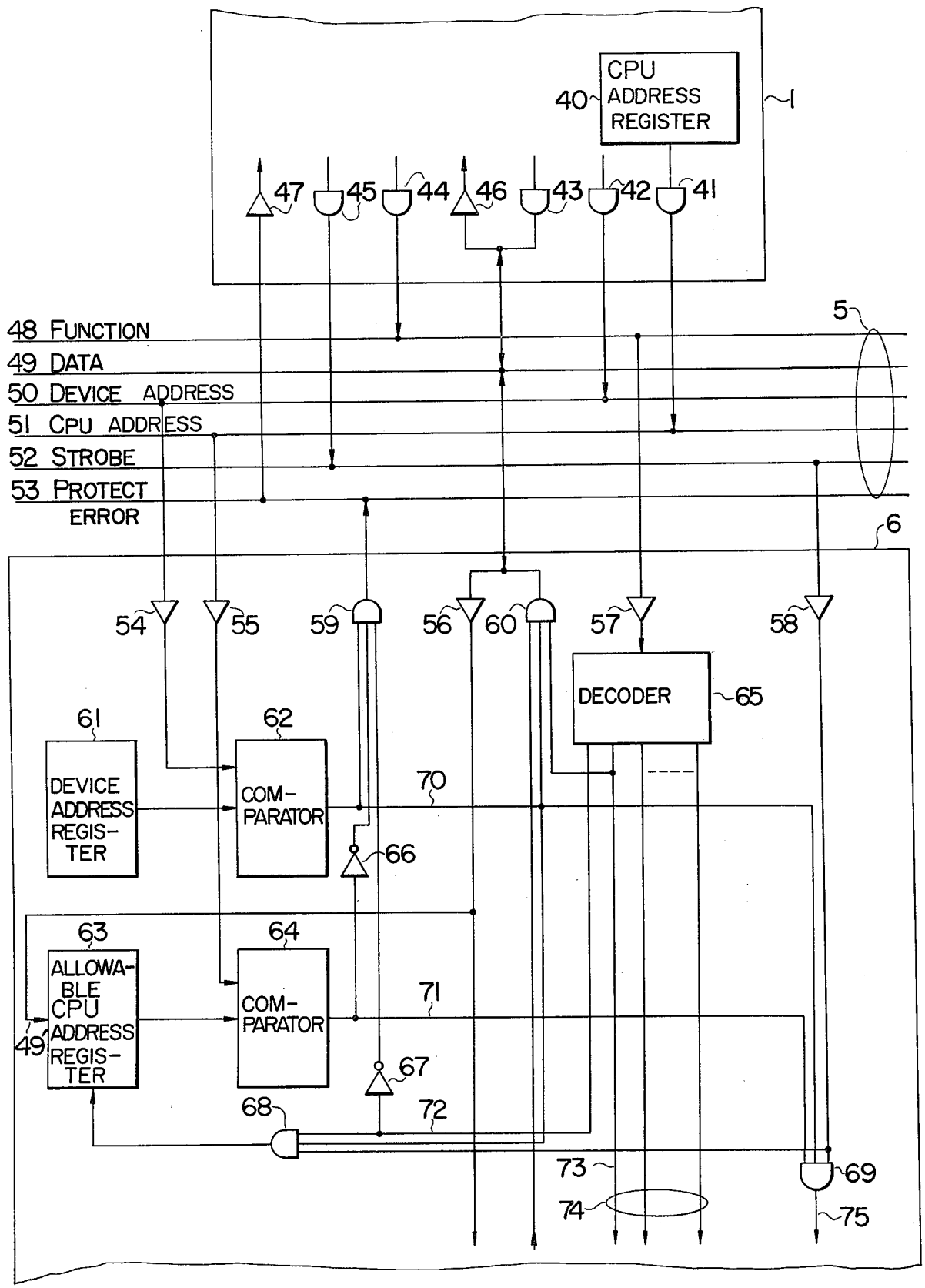

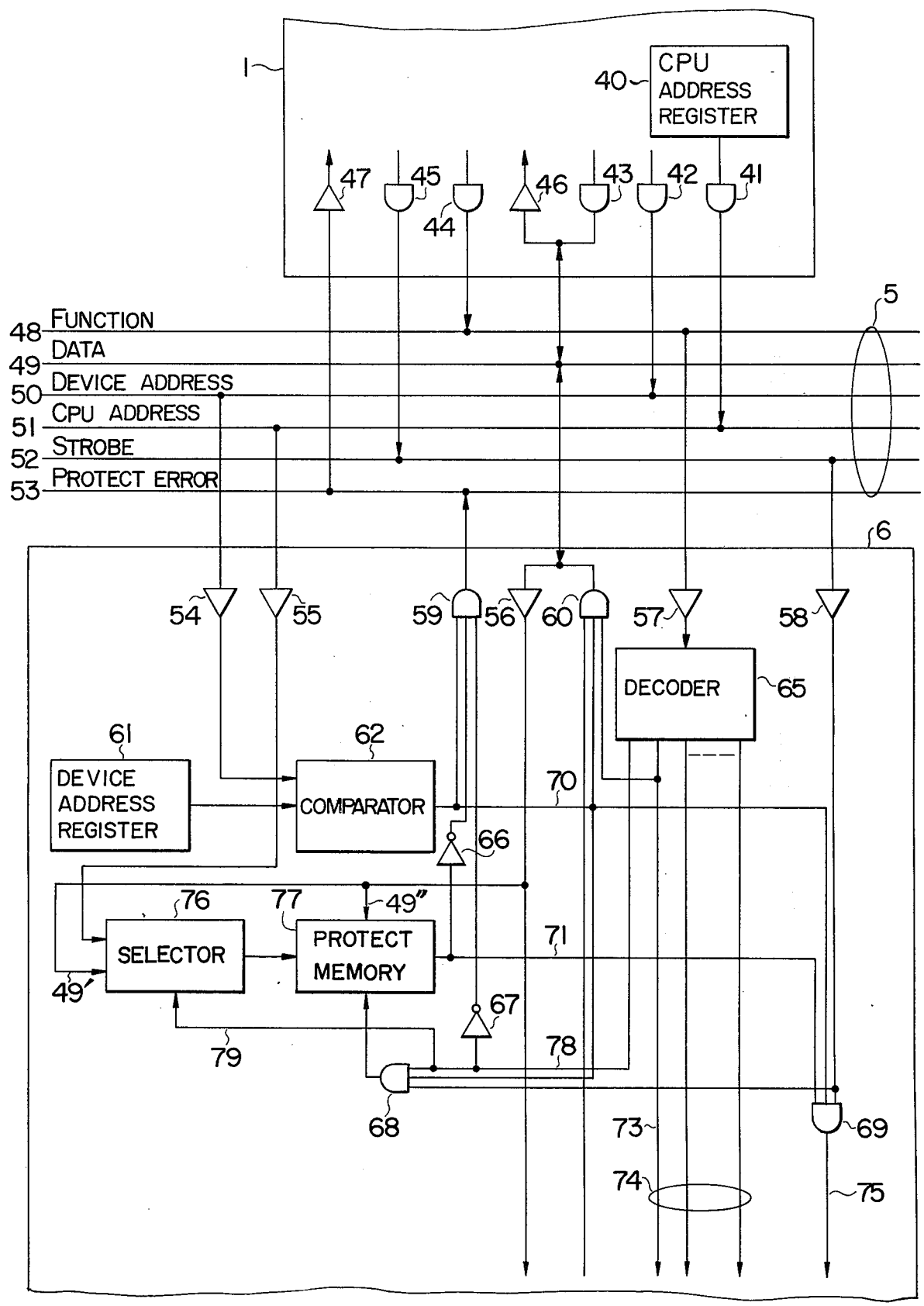

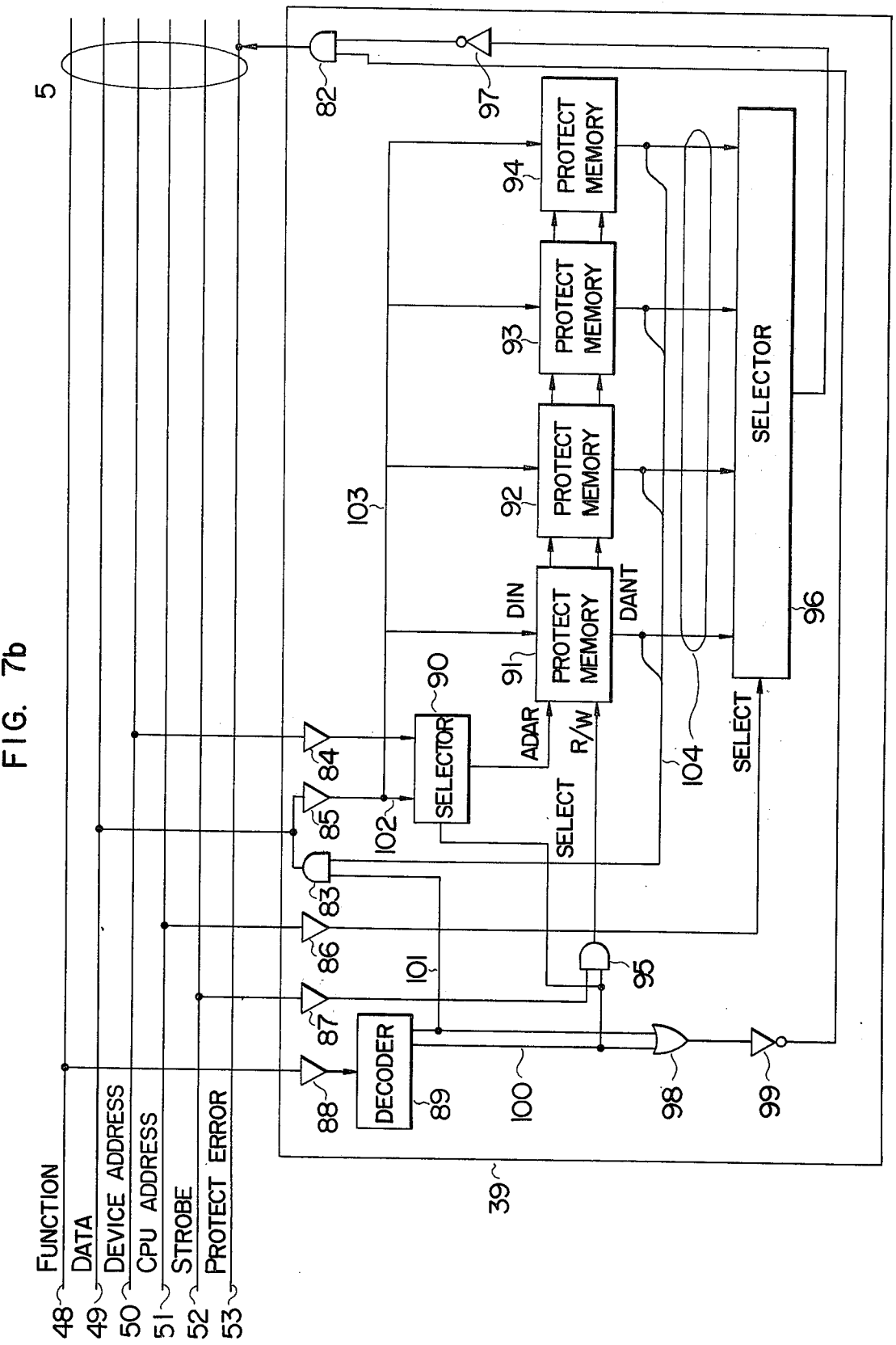

DEVICE PROTECTION METHOD AND APPARATUS

BACKGROUND OF THE INVENTION

1. Field of the Invention

The present invention relates in general to an input/output interface for an electronic computer system and more particularly to a device protection system for a multi-computer system interconnected through input/output interfaces of a bus type, which protection system serves for preventing the state or information of irrelevant devices from being destroyed due to possible erroneous operation of a central processor unit (CPU), thereby to enhance the reliability of the multi-computer system.

2. Description of the Prior Art

In a multi-computer system comprising a plurality of central processor units and input/output devices interconnected by means of interfaces of a bus line type, there has hithertofore been made no proposition as to the protection of the input/output devices as above mentioned. In general, which device is allowed to be used by a certain CPU in the multi-computer system is monitored or controlled through software technique. So far as the software as well as the employed hardware is operating in normal conditions, the protection of the devices will be unnecessary. However, there may arise the possibility of the state or information of irrelevant devices being destroyed due to overrun of the software or failure of the hardware in one of the central processor units or CPU particularly in the case of the multi-computer system having interconnections through the bus type interface, which may eventually involve the stoppage or shutdown of the whole system. Inherently, the multi-computer system has to be provided with means to prevent the shutdown of a certain CPU which may result in the shutdown of the whole system, since otherwise the reliability of the system will be lowered.

SUMMARY OF THE INVENTION

An important object of the present invention is to eliminate the above-described disadvantages and provide a novel device protection method and apparatus which are capable of protecting the information and/or the state of the irrelevant devices from being destroyed due to the overrun of the software and/or failure of the hardware in any one of the central processor units or CPUs, thereby to enhance the reliability of the multi-computer system.

Another object of the invention is to provide a device protection method and apparatus which effectively prevent the propagation of any possible erroneous operation of a certain CPU to the overall computer system during the maintenance of that central processor unit, thus allowing normal operation of the remainder of the system during the maintenance operation of certain central processor units.

According to one aspect of the present invention, there is provided a device protection hardware which serve to determine if data transfer is admitted or allowable between certain devices. Upon the data transfer an address signal identifying an accessed device as well as an address signal identifying an access device are produced, and the device protection hardware determines if the combination of the incoming address signals can be admitted. If it is not admitted, a protect error signal is generated to inhibit the transfer of the data.

According to another aspect of the present invention, the device protection hardware is individually provided for each of the devices in a distributed manner and has a device protect register incorporated therein and serving to store the addresses of the devices which are allowed to transfer data with the associated device, whereby the incoming address signal from the access or interrogating device is compared with the corresponding content stored in the address register to determine the allowability of data transfer.

According to still another aspect of the invention, each of the devices is provided with a device protect memory containing bits representing combinations of the devices between which transfer of data is allowed, whereby the incoming address signal from the access device is utilized to read out the corresponding bits stored in the device protect memory of the accessed device thereby to determine the allowability of data transfer between these devices.

A further feature of the present invention can be seen in the arrangement in which a single device protection hardware is provided for common use among the various devices. Such an independent hardware unit is coupled to the bus and serves, upon the transfer of data, to determine on the basis of the incoming address signals from the accessing and the accessed devices whether the data transfer can be admitted between these devices. If it is not allowable, the hardware produces the protect error signal to inhibit the data transfer.

The above and other objects, features and advantages of the present invention will become more apparent from the following description of preferred embodiments of the invention. The description makes reference to the accompanying drawings.

BRIEF DESCRIPTION OF THE DRAWINGS

FIG. 5 is a circuit diagram showing an embodiment of the hardware shown in FIG. 2 in which registers are used.

FIG. 6 is a circuit diagram showing another embodiment of the hardware shown in FIG. 2 in which memories are used.

FIGS. 7a and 7b shows still another embodiment of the hardware employed in the protection system shown in FIG. 3.

DESCRIPTION OF THE PREFERRED EMBODIMENTS

Figure 1:
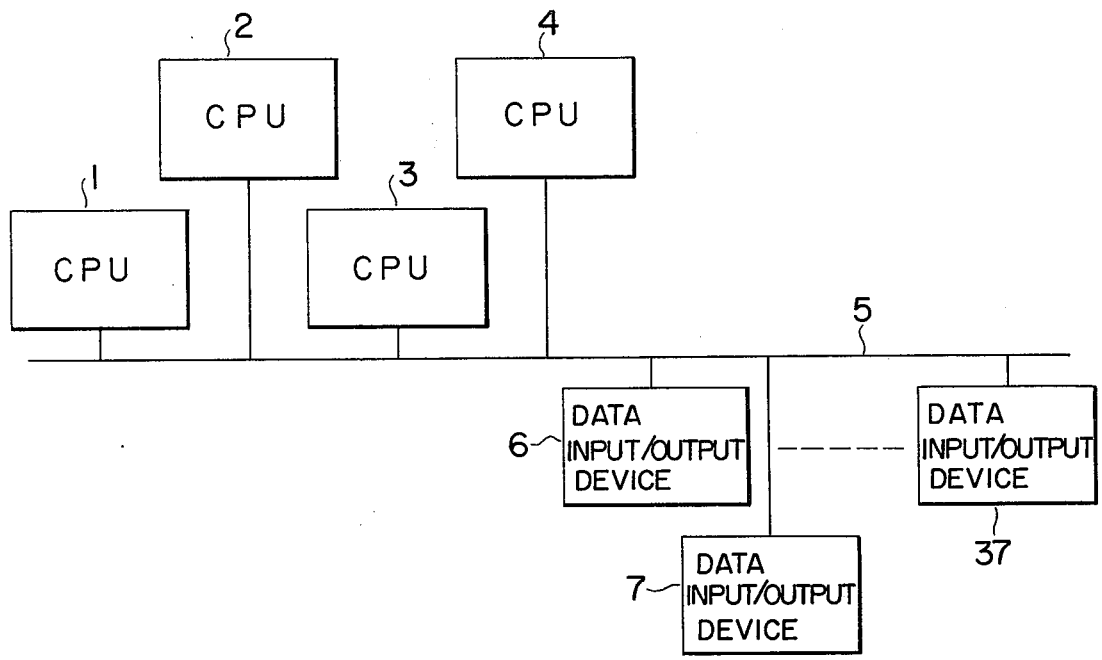
FIG. 1 is a block diagram showing schematically a multi-computer system provided with bus type input/output interface for interconnections.

Referring to FIG. 1 which shows, by way of example, a multi-computer system having an input/output interface of a bus type for the interconnections, four central processing units or CUPs 1 to 4 and 32 data input/output devices 6 to 37 are provided and connected to a bus line 5 to form the multi-computer system. It will of course be understood that such arrangement is merely for the convenience of illustration and any more number of CPUs and the devices may be employed with the much complicated arrangements of bus such as duplicated or divided bus used. But, such a simplified system as illustrated in FIG. 1 will be useful for better understanding of the principle of the invention.

Figure 2:
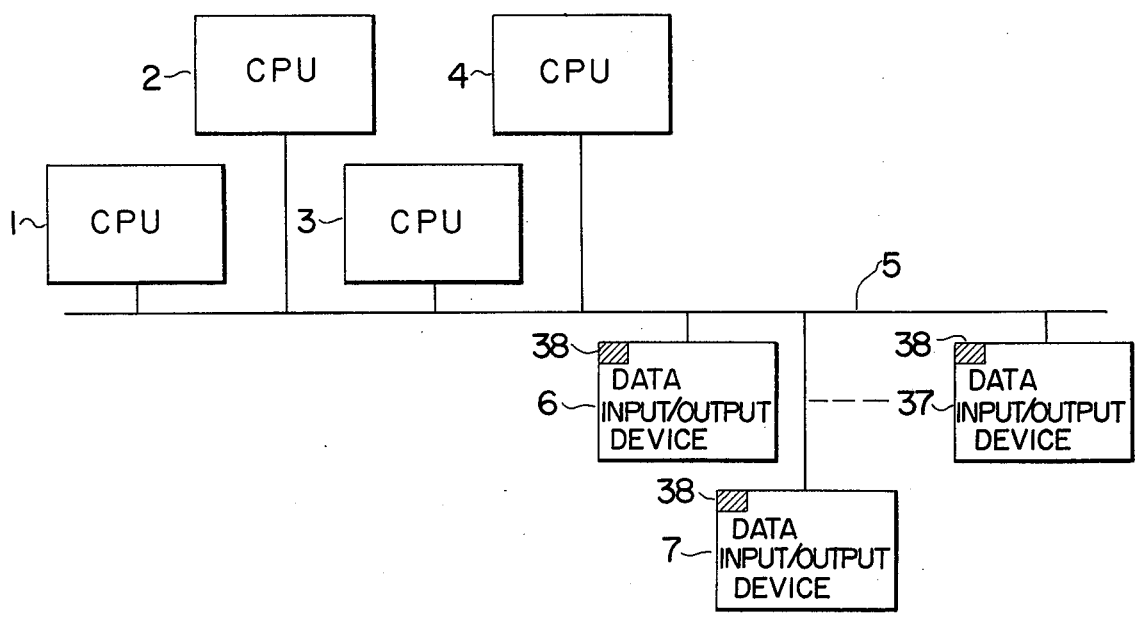
FIG. 2 shows in a block diagram a multi-computer system having individual device protection hardware provided for each of the devices according to the present invention.
Figure 3:
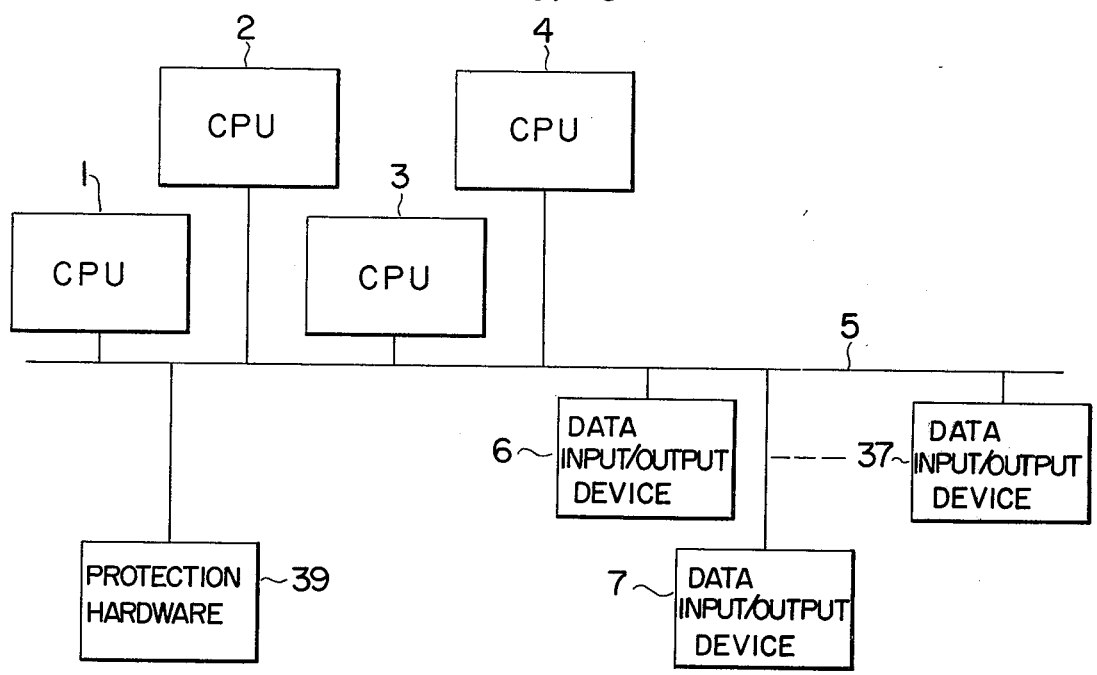
FIG. 3 is a block diagram schematically showing a multi-computer system provided with a single independent hardware for providing protection to all the devices.

FIG. 2 shows the multi-computer system in a block diagram similar to the one shown in FIG. 1 but provided with individual hardware for the device protection for each of the devices in a distributed manner, while in the system shown in FIG. 3 the hardware for the device protection is constructed as a single unit independently from the individual devices to be serviced. In other words, in case of the system shown in FIG. 2, each of the devices 6 to 37 has the respective hardware 38 incorporated therein, while in the system shown in FIG. 3 a single protection hardware or apparatus 39 is independently provided to serve for protecting in common all the devices and is to this end connected to the bus 5.

Figure 4A:
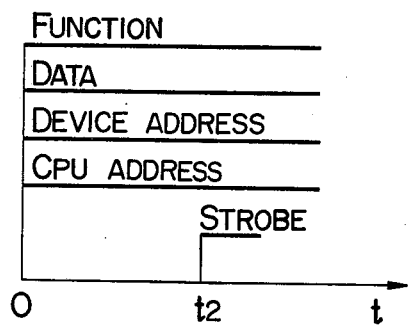
FIGS. 4a and 4b show time charts for illustrating the transfer of input/output data according to the invention.
Figure 4B:
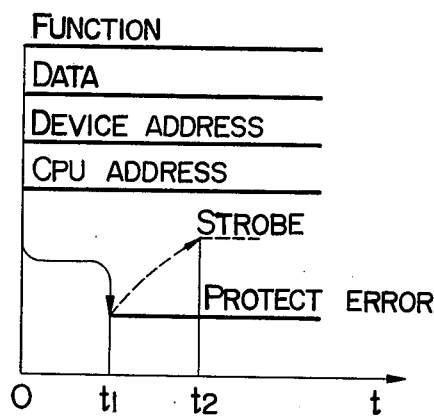

In either case, the common fundamental operation of the device protection hardware resides in protecting the devices upon transfer of the input/output data by determining if the transfer is allowable or not on the basis of the comparison between the received address or number signals identifying the accessing CPU and the accessed input/output device. If the transfer is not admissible, the device protection hardware produces a protect error signal to inhibit the device from the input/output operation. Such process will be more clearly understood by referring to FIGS. 4A and 4B which illustrate, by way of example, the case in which the data are to be transferred from the CPU to the device. In case of FIG. 4A, it is assumed that no device protect signal is produced. The corresponding CPU thus can output the signals of function command, data, the address or number of the device to be accessed and the address of the accessing or interrogating CPU itself. After the elapse of time $t_2$, a strobe signal is produced to trigger the operation of the accessed device designated by the incoming device address signal so that the accessed device can actually receive the data signal. On the other hand, in case of the illustration shown in FIG. 4B, a protect error signal appears. Namely, it is assumed that the device protection hardware produces the protect error signal at a time point $t_1$ which succeeds to the output of the signals of function command, data, device address and the CPU address signals from the accessing CPU but proceeds to the occurrence of the strobe signal at the time point $t_2$. In other words, each of the CPUs is arranged such that the accessing CPU produces the strobe signal for triggering the operation of the accessed device at the time point $t_2$ after a lapse of time from the time point $t_1$ at which the accessing CPU has recognized the presence or absence of the protect error signal. In this way, when the protect error signal is produced, the accessed device is inhibited from the reception of the data signal and hence the input/output operation even if it receives the strobe signal. In the following description, the arrangement of circuitry is assumed to be made such that the strobe signal is inhibited at the side of the input/output devices upon the occurrence of the protect error signal. However, it is equally possible to provide means for inhibiting the output of strobe signal at the CPU. Further, it is assumed in the following description of the convenience' sake that the bus comprises a minimum number of lines such as function command line, data line (bidirectional), device address line, CPU address line, strobe line and the device protect line. Additionally, the description about the circuit arrangements of the CPU and the input/output devices is simplified to the degree necessary for the understanding of the invention, since such circuit arrangements are generally known in the art of the data transmission.

Now, referring to FIG. 5 which shows schematically a circuit arrangement of the first embodiment of the invention, in which the device protection hardware is individually provided for each of the devices (see FIG. 2), it is again assumed by way of example that the transfer of input/output data is to have taken place from the central processor unit or CPU 1 to the device 6. The CPU 1 will then output signals of the function command 48, data 49, device identifying number or address 50, CPU address 51 and the strobe 52 to the associated bus lines 5 through respective driver circuits 41 to 45. The CPU identifying number or address signal 51 has previously been stored in the CPU address register 40 incorporated in the CPU 1. In a similar manner, the function signal 48, data 49, device identifying number or address signal 50 are also read out from respective registers provided in the CPU 1. Detailed description of the circuit arrangements of these registers will be unnecessary for understanding the essence of the present invention. As hereinbefore described, the strobe signal 52 has undergone a delay in the CPU 1 for the time interval $t_2$. Each of the devices (only one of which is shown in FIG. 5 as device 6) receives the above-described signals through respective receivers 54 to 58 incorporated in each device. The device address signal 50 thus received by each device is compared by a comparator 62 with an individual device address signal which represents the device number and which has been stored in a register 61 incorporated in each device. If the coincidence is found between these device address signals in any one of the devices, for example in the device 6 shown in FIG. 5, a device select signal 70 is produced to set the device 6 in the state ready for the data input/output operation. On the other hand, the incoming CPU address signal 51 is compared by a comparator 64 with the contents of a protect signal register 63 storing the number or address of the CPU which is admitted to access the device 6. When the coincidence is detected between these CPU addresses, i.e., the CPU 1 is allowed to perform the transfer operation with the device 6, an admission or allowance signal 71 is produced to thereby enable an AND gate 69 to produce a device operation trigger signal 75 in cooperation with the device select signal 70 and the strobe signal 52 which is passed through the receiver 58. As a result, the device 6 may receive the data 49 as enabled by a signal 74 produced by a decoder 65 adapted to decode the function signal 48. In the case where the date is read out from the device 6 into the CPU 1 alternatively, a read-out signal 73 is produced from the function command decoder 65, so that the data can be transferred from the device 6 into the CPU 1 through a driver 60 of the device 6, data line 49 of the bus 5 and a receiver 46 of the CPU 1. Returning the description, unless the coincidence has been detected by the comparator 64 between the incoming CPU address signal 51 and the contents stored in the protect register 63, the admission signal 71 will not be produced even if the device select signal 70 has been produced, thereby to inhibit the generation of the device trigger signal 75 and hence the input/output operation of the device 6. Additionally, the protect error signal 53 is produced through a negating gate 66 and a driver circuit 59 and is supplied to the CPU 1 through a receiver 47, resulting in the actuation of a countermeasure program to dispose of the occurred protect error through an interrupt routine for example. Since it is generally required that the contents in the protect register 63 can be replaced or exchanged, the function command signal has to contain a replacing command for the protect register 63. When the device 6 is selected, namely when the select signal 70 is produced, and the replacing command signal 72 is produced from the function decoder 65, the protect register 63 is placed with the two most significant bits 49' of the data 49 from the CPU 1 through an AND gate 68 which is enabled by the strobe signal 52 from the CPU 1 the select signal 70 and the replacing command signal 72. Two bits are sufficient since, in the present assumed example, four CPUs are employed and the addresses thereof can be identified each by the two most significant bits of the data 49. It is to be noted that such replacing operation can be effected even when the admission signal 71 is not produced and that the generation of the protect error signal 53 is inhibited by the function of a negating gate 67. In this manner, the CPU and the device to be paired for the input/output data transfer may be exchangeably determined by the protect register 63.

FIG. 6 shows a circuit diagram of a second embodiment of the invention in which the device protect hardware is individually provided for each of the input/output devices (see FIG. 2). The arrangement shown in FIG. 6 differs from the one shown in FIG. 5 in that a protect memory 77 is substituted for the protect register 63 of the device 6 shown in FIG. 5. The arrangement of the CPU 1 remains unchanged. Description will be made only about the points different from the arrangement of FIG. 5. In the normal transfer operation (i.e. when the operation is not directed to the content replacing function for the protect memory), the incoming CPU identifying number or address signal 51 is fed through the receiver 55 and a selector 76 to the protect memory 77 as an address ADDR. The data thus read out from the memory 77 constitutes the admission signal 71. The address ADDR in the protect memory is preset through the rewriting or replacing function. In more detail, when the protect memory rewriting signal 78 is produced, the two most significant bits 49' of the incoming data 49 are selected by the selector 76 as the address for the memory 77 and the least significant one bit 49'' of the data 49 is written into the selected address with the aid of the strobe signal 52 from the CPU 1. The remaining operation of the circuit shown in FIG. 6 is the same as that of the circuit shown in FIG. 5 and therefore further description is omitted.

It will be noted from the foregoing description that, while in the case of the first exemplary embodiment only one device is adapted to be utilized by only one CPU (the CPU to be paired can, of course, be exchanged through the aforementioned replacing function), in the second embodiment a single device may be utilized by a plurality of CPUs.

Figure 7A:
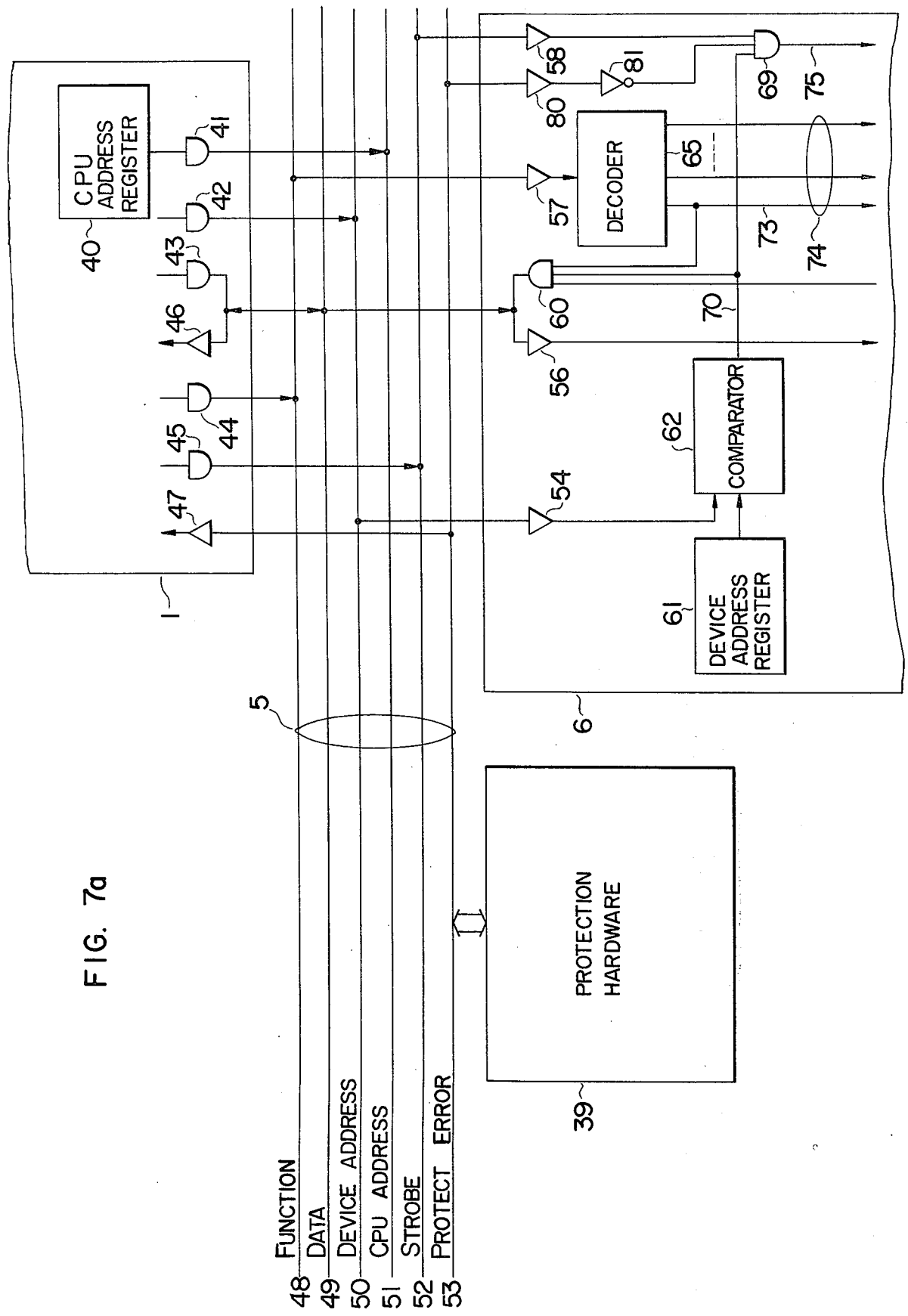

FIGS. 7a and 7b show another embodiment in which all the device protection hardware is assembled together as a single and independent device protection apparatus (see FIG. 3). The arrangement of CPU 1 is the same as those shown in FIGS. 5 and 6. The device 6 has an arrangement similar to the one in which no device protection is provided except that in the device 6 the strobe signal 52 from the CPU 1 is inhibited by the protect error signal 53 through a receiver 80 and a negating gate 81 when the protect error signal 53 is produced. It is to be noted that the protection hardware shown in FIGS. 5 and 6 are incorporated together in the protection apparatus 39 in case of the arrangement shown in FIG. 7. Upon the transfer of the input/output data from the CPU 1 to the device 6, the device identifying number or address signal 50 incoming to the device 6 and the content of the device number or address register 61 of the device 6 are compared with each other by the comparator 62. When coincidence is detected between these signals and that no protection error signal 53 is produced from the protection apparatus 39, the strobe signal from the CPU 1 constitutes the device trigger signal 75 through the AND gate 69 and allows the input/output operation commanded by the function signal 48. In case the protection error signal 53 is produced by the protection apparatus 39, the strobe signal 52 from the CPU 1 is inhibited by means of the receiver 80 and the negating gate 81, so that no device trigger signal 75 is produced with a result of the inhibition of the input/output operation. For designing the circuit arrangement of the protection apparatus 39, it may be contemplated to provide a register in correspondence to each device as is in the case of FIG. 5 or provide a memory for each device as is in the embodiment shown in FIG. 6. However, considering the fact that the number of CPUs is in general less than that of devices, it is preferred to provide memories for storing the utilizable devices in correspondence to the CPUs. Such arrangement is shown in FIG. 7b. When the normal input/output data transfer operation is to be effected in this embodiment, the device 6 will perform the abovedescribed operation. At the same time, the device identifying number or address signal 50 supplied from the CPU 1 constitutes an addressing signal for program memories 91 to 94 storing previously the available devices through a receiver 84 and a selector 90. Data signal 104 thus read out from the addressed memory as well the CPU address signal incoming through a receiver 86 are applied to a selector 96 to form a select signal which serves to select the data associated with the CPU address signal 51. When the selection is not allowed, the protect error signal 51 is output to the line 51 through a negating gate 97 and a driver 82, so that the data input/output operation of the device 6 is inhibited. In this manner, the protection apparatus 39 determines allowable combinations of the device address signal 50 and the CPU address signal 51 with the aid of the memories 91 to 94. In this connection, the function to set the memory and the function to read out the written contents are required. Assuming that a protection memory read-out signal 101 is produced through the function line 48, a receiver 88 and a decoder 89, the device address signal 50 appearing at that time constitutes the addressing signal to read out the protection memories 91 to 94 and the data 104 thus read out is written into the CPU 1 through a driver 83 as the data 49. During this phase, the protect error signal 53 is inhibited by an OR gate 98 and a negating gate 99. When the contents of the protection memories 91 to 94 are to be changed, a protection memory writing signal 100 is produced through the function line 48, the receiver 88 and the decoder 89, while the strobe signal 52 from the CPU 1 is applied through an AND gate 95 thereby to form a write command signal for the protection memories 91 to 94. The selector 90 then selects the five most significant bits 102 of the data (since 32 devices are employed, 5 bits are required for the identification therefor) through a receiver 85 as the addressing signal, while the four least significant bits 103 of the data 49 are distributed to the respective memory 91 to 94 as the data to be written. In this way, by storing data for determining the allowability for all the combinations of the CPUs and the devices by means of the single and independent protection apparatus, it is possible upon the transfer of data to determine whether the concerned combination is allowable and produce the protect error signal when it is not allowable or admissible, thereby inhibiting the data input/output operation. The embodiment shown in FIG. 7b is advantageous over the first and the second embodiments in that a greater degree of option is possible in designing the protection apparatus. In the case of a single-computer system, inherently, the protection of the devices is not necessary. Besides, the device itself may be made inexpensively.

Although the foregoing description has been made with CPU clearly discriminated from the devices, this is merely for the convenience of description. The CPU may be terminologically encompassed by "device". It should therefore be appreciated that the term "device" used in the description of claims covers also the CPU.

We claim:

1. In a data transmission system in which a plurality of devices are coupled to a bus for data transfer among said devices, each of said devices having its own device address to identify itself and including address means for producing onto said bus a destination address signal indicating a device address to be accessed for data transfer and a source address signal indicating its own device address, each of said devices being enabled to effect data transfer only when there is coincidence between the device address indicated by a destination address signal which is produced onto said bus and its own device address, the improvement comprising a device protection system including:

first means for storing at least one preset enabled address combination of said devices, each two devices corresponding to each of said preset enabled address combinations being capable of effecting data transfer therebetween; and second means for determining whether a combination of two devices according to the destination address and source address signals on said bus corresponds to said at least one preset enabled address combination of said first means and for applying a protect error signal to the accessing device through such bus when said combination on said bus is not a preset enabled address combination of said first means.

2. A device protection system according to claim 1, in which said first means includes a device protect register provided in each of said plurality of devices, said device protect register containing at least one device address for identifying another device with which data transfer is enabled; and said second means includes a comparator means and logic means provided in each of said plurality of devices, said comparator means of each device used for comparing the contents of its own device protect register with source address signals applied from said bus, and said logic means of each device for transferring the output of said comparator means onto said bus when its own device is the accessed device.

3. A device protection system according to claim 1, in which said first means includes a device protect memory provided in each of said plurality of devices, each said device protect memory containing a plurality of bits respectively corresponding to said plurality of devices with the exception of its own device, one of said bits being set to indicate a data transfer between its own device and the device corresponding to the set bit; and said second means includes a selector means and a logic means provided in each of said plurality of devices, said selector means of each device being responsive to a source address signal produced on said bus for reading out the contents of a bit of said device protect memory of its own device which bit corresponds to the device producing said source address signal on said bus, and said logic means of each device for producing said contents of said bit read out from said device protect memory of its own device when its own device is the accessed device.

4. A device protection system according to claim 1, in which said first and second means are provided in a single protection hardware which is common to all of said plurality of devices and connected to said bus, said first means including a plurality of protect memories respectively corresponding to each of said plurality of devices; each of said plurality of protect memories having a plurality of bits respectively corresponding to said plurality of devices with the exception of its own device, one of said plurality of bits of each of said plurality of protect memories being set to indicate a data transfer between its own device and the device corresponding to the set bit; and said second means includes a first selector means for reading out, in response to one of a source address signal and a destination address signal produced onto said bus, the bit contents of said plurality of device protect memories corresponding to said one of said source address and destination address signals, and a second selector means responsive to the other of said source address and destination address signals for selecting one of said read-out bit contents corresponding to the other of said source address and destination address signals for producing the selected one of said read-out bit contents onto said bus.

* * * * *